United States Patent [19]
Schless

[11] Patent Number: 6,039,137
[45] Date of Patent: Mar. 21, 2000

[54] MULTI-TERRAIN ELECTRIC MOTOR DRIVEN CYCLE

[76] Inventor: Ely Schless, 3165 E. Main St., Ashland, Oreg. 97520

[21] Appl. No.: 09/021,536

[22] Filed: Feb. 10, 1998

[51] Int. Cl.[7] .................................................. B62D 61/02
[52] U.S. Cl. ........................... 180/220; 280/274; 280/284
[58] Field of Search ..................................... 180/205, 206, 180/207, 220; 280/274, 276, 277, 284, 285, 293, 270, 281.1, 288.4

[56] References Cited

U.S. PATENT DOCUMENTS

| D. 176,263 | 12/1955 | Ito et al. | D90/8 |
|---|---|---|---|
| 4,221,275 | 9/1980 | Pennebaker et al. | 180/206 |
| 4,374,549 | 2/1983 | Lacroix | 180/207 |
| 4,406,342 | 9/1983 | Lacroix | 180/220 |
| 4,541,500 | 9/1985 | Gelhard | 180/205 |
| 5,335,929 | 8/1994 | Takagaki et al. | 280/283 |
| 5,433,284 | 7/1995 | Chou | 180/205 |
| 5,791,674 | 8/1998 | D'Aluisio et al. | 280/284 |
| 5,819,868 | 10/1998 | Koike et al. | 180/220 |
| 5,853,062 | 12/1998 | Hulett | 180/206 |

*Primary Examiner*—Kevin Hurley
*Assistant Examiner*—Avraham H. Lerner
*Attorney, Agent, or Firm*—Albert O. Cota

[57] ABSTRACT

A multi-terrain electric motor driven cycle (10) which is constructed around a monoplaner frame (12). Strategically located on the frame (12) are a front and rear damping assembly (94, 166), a rear shock absorbing assembly (180), a cycle drive assembly (240), a front and rear hydraulic brake assembly (256,274), and right and left battery housings (224,226). The two housings contain respectively a first and second battery pack (304,306) which supply power to an electric motor (200) which powers the cycle (10). The motor (200) is controlled by a motor control signal (344) derived from an electrical power control circuit (300). The circuit (300) which includes the battery packs (304,306), incorporates a built-in battery charger (312), a solenoid (326) that when energized by a manually operated power control switch (320) causes a power/speed control circuit (340) to produce the motor control signal (344). The amplitude of the motor control signal is controlled by the combination of an electronic throttle circuit (346) and a manually adjusted mechanical throttle (350).

30 Claims, 5 Drawing Sheets

MULTI-TERRAIN ELECTRIC MOTOR DRIVEN CYCLE

TECHNICAL FIELD

The invention pertains to the general field of power driven cycles and more particularly to a multi-terrain, monoplaner frame cycle that is powered by an electric motor.

BACKGROUND ART

In recent years many alternative means of providing power for vehicles have been developed. One of the most popular and promising power means is electricity. Several auto makers have begun to offer electricity-powered vehicles, such as Ford and General Motors with their EV-1 electric cars and Toyota with their hybrid gas and electric Privus vehicle.

One of the reasons that it is difficult to design electric vehicles, such as automobiles, is the inability to provide long-lasting, sufficient power without having to utilize an extremely large number of heavy batteries. It was the obvious weight requirements of a passenger automobile that led designers to consider the possibility of electrically-powered two-wheeled cycles, such as motorcycles and bicycles which have a substantially lower weight and lower power requirements.

One of the major drawbacks to designing and building electrically-powered two-wheeled cycles was that manufacturers were currently selling a large quantity of gasoline-powered cycles and cycles using electrically assisted hybrid power systems. There was not a great deal of incentive to invest substantial amounts of money into research, development and subsequent building of a product that was already selling well as currently designed. However, even with a lack of incentives, the current multi-terrain electric motor driven cycle disclosed herein was designed and manufactured. The inventive cycle offers an alterative design to currently available gasoline or hybrid powered cycles.

A search of the prior art did not disclose any patents that read directly on the claims of the instant invention, however the following U.S. patents are considered related:

| U.S. PAT. NO. | INVENTOR | ISSUED |
|---|---|---|
| 5,474,148 | Takata | 12 December 1995 |
| 5,226,501 | Takata | 13 July 1993 |
| 3,921,745 | McCulloch, et al | 25 November 1975 |

The U.S. Pat. No. 5,474,148 discloses a bicycle having an electric motor assist. The assist ratio provided by the electric motor is varied in response to a variety of bicycle conditions, such as speed, to reduce the consumption of electrical energy and to avoid over speed conditions. Various control ratio options are available and the operator may select the assist ratio.

The U.S. Pat. No. 5,226,501 discloses an electric power bicycle wherein an electrical motor is employed for assisting in the pedaling of the bicycle. An arrangement is included for changing the state of the electrical power when the bicycle is pushed. The circuit for the electric motor is opened when the bicycle is pushed rearwardly so as to avoid undue resistance to the pushing. In other embodiments, the electric motor is energized upon pushing so as to assist in pushing the bicycle.

The U.S. Pat. No. 3,921,745 discloses an electric bicycle employing a chain, V-belt or friction pulley drives and a motor controller circuit variable in both frequency and duty cycle. Regenerative braking and the conversion of the motor to a transformer for charging the bicycle battery is disclosed. The pressure of the armature brushes of the motor is variable under light load conditions to increase motor efficiency.

For background purposes and as indicative of the art to which the invention is related reference may be made to the remaining cited patents.

| U.S. PAT. NO. | INVENTOR | ISSUED |
|---|---|---|
| 5,491,390 | McGreen | 13 February 1996 |
| 5,375,676 | Takata et al | 27 December 1994 |
| 5,370,200 | Takata | 6 December 1994 |
| 4,871,042 | Hsu et al | 3 October 1989 |
| 3,961,678 | Hirano et al | 8 June 1976 |

DISCLOSURE OF THE INVENTION

The multi-terrain electric motor driven cycle is built around a monoplaner frame and is primarily designed for use as an "off road" cycle. The term monoplaner is used herein to differentiate from a conventional motorcycle frame which typically uses several laterally placed tubes to establish width. In contrast, bicycles are constructed on a single frame having a vertical plane such as the monoplaner frame of the present invention. The use of a monoplaner frame design for electric motor driven cycles is now practical because of the components used on "mountain bikes" such as spring loaded and dampened suspension system and a braking system that uses hydraulic disc brakes.

The inventive cycle also employs a unique design for packaging a pair of battery packs. These battery packs are enclosed within a right and left battery housing which provide nearly equal front and rear tire loading, and account for at least 50 percent of the total cycle weight. The battery packs are also designed to be used individually or in combination to power the cycle's electric motor.

The cycle design also features a front and rear damping assembly, a hydraulic braking system that operates both the front and rear wheels by means of levers attached to a handlebar, a steering stop which prevents acute steering angles, a centerstand, a pair of footpegs and an electrical power control system.

The centerstand has two downward extending legs and is centrally located with respect to the cycle's longitudinal center of gravity. This allows the cycle to remain balanced when either the front or rear wheel is removed for servicing. Also, the legs of the centerstand have sufficient lateral width that if either of the side mounted battery housings are removed, the cycle's lateral center of gravity remains between the two legs of the centerstand to prevent the cycle from falling sideways.

The cycle drive assembly employs two stages of gear reduction. The first stage produces a ration of 3 or 4 to 1 and consists of the electric motor, a toothed belt, a first sprocket attached to the motor shaft, and a second sprocket. The second stage also produces a ration of 3 or 4 to 1 and consists of a chain ring which is attached to the rear wheel and is driven by a chain drive connected to a third sprocket which is coaxially attached to and driven by the second sprocket. The first stage is selected for quietness and efficiency of operation at a higher motor speed of approximately 5000 RPM. The second stage is selected for higher torque requirements.

A unique design of the cycle is that the monoplaner frame utilizes a lower tube, also referred to in cycle jargon as a "bottom bracket". This lower tube integrates the footpegs, the centerstand, the first and second sprockets, and the electric motor. The lower tube, due to its position and strength, provides an ideal node for comfortable, safe riding. The vehicle weights 150 pounds and has a maximum capacity of 225 pounds which provides for a cycle capacity that is 1.5 times greater than its weight.

The electrical power control circuit consists of a battery power source which contains two battery packs, a built-in battery charger, a power control switch that controls the operation of a solenoid, a power/speed control circuit that is operated by an electronic throttle circuit and which produces a signal that controls the speed of the electric motor.

In view of the above disclosure, it is the primary object of the invention to produce a multi-terrain electric motor driven cycle that utilizes a monoplaner frame design which includes an electric motor that is powered by a pair of balanced right and left battery housings which contain the battery packs.

In addition to the primary object it is also an object of the invention to produce a cycle that:

utilizes a design which incorporates in the monoplaner frame a front and rear wheel hydraulic braking system, a front and rear damping assembly, an optimized cycle drive system, an electrical power control system, and other elements that make the cycle safer and provide greater terrain capabilities than can be negotiated by current cycle models, includes a built-in battery charger, is relatively reliable and maintenance free, with the exception that the battery packs must be periodically charged by the built-in battery charger which is activated when connected to 120 volts a-c, when the batteries are fully charged, the cycle can be driven for approximately 35 miles, and is cost effective from both manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
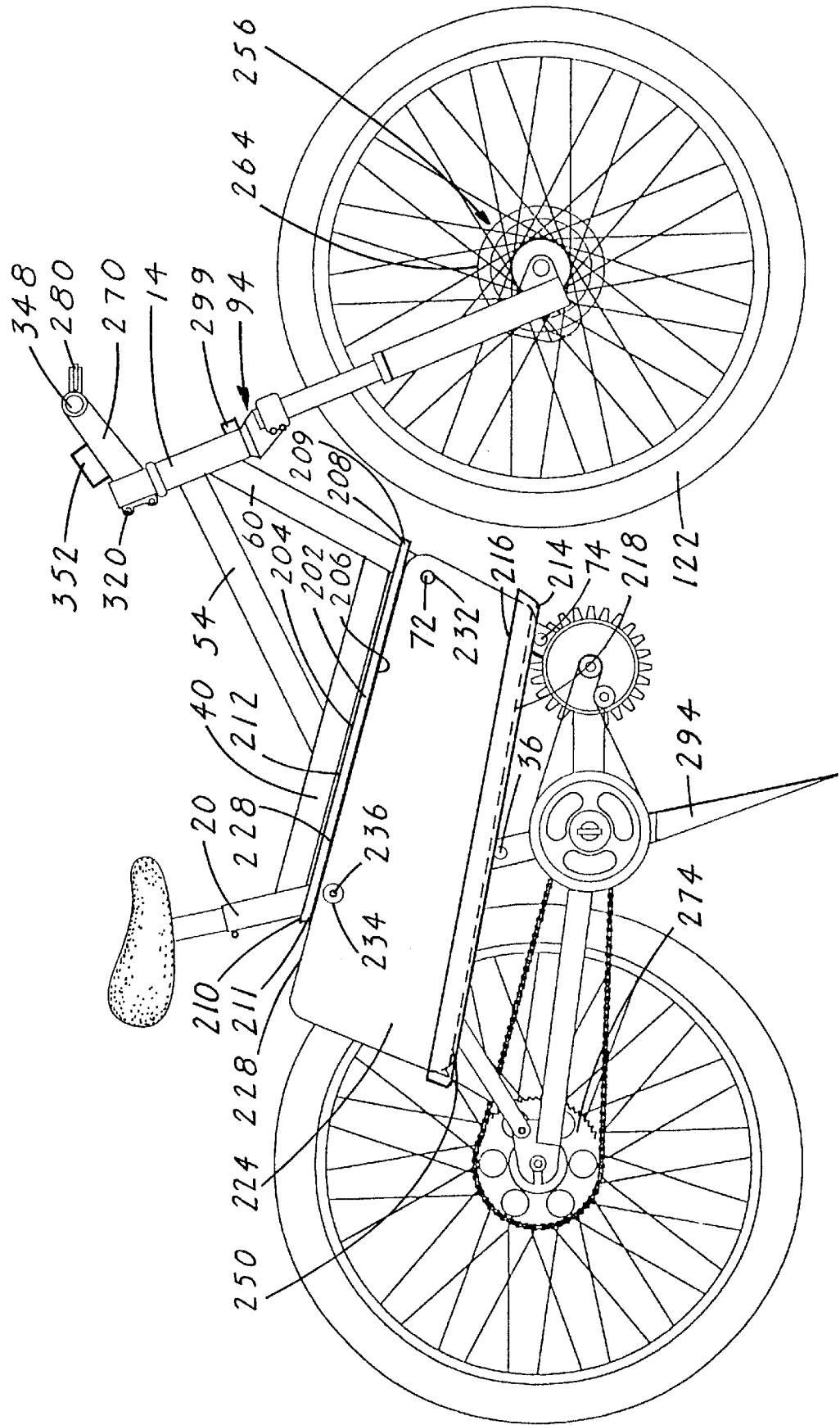
FIG. 1 is a right side elevational view of the multi-terrain electric motor driven cycle.

The best mode for carrying out the invention is presented in terms of a preferred embodiment for a multi-terrain electric motor driven cycle 10. The preferred embodiment, as shown in FIGS. 1–7, is comprised of the following major elements, a monoplaner frame 12 consisting of a head tube 14, a seat tube 20, an upper crossbar assembly 38, a front tube 60, a lower tube 78, a front damping assembly 94, a front wheel 122, a rear fork assembly 126, a rear wheel 160, a rear damping assembly 166, a rear shock absorbing assembly 180, an electric motor 200, a battery tray 214, a protective cover 220, a right bettery housing 224, a left battery housing 226, a cycle drive assembly 240, a braking system 260, a handlebar 270, a right foot peg 282, a left foot peg 284, a centerstand 294, and an electrical power control circuit 300.

The multi-terrain electric motor driven cycle 10 is based on a fully suspended and dampened monoplaner structure frame design. The term monoplaner is used to differentiate from a conventional motorcycle frame which uses more laterally placed frame tubes to establish width. The use of a monoplaner frame has only recently become practical for use on electric cycles due to the recent rise in mountain bike technology which includes the use of spring loaded and dampened suspensions and hydraulic disc brakes.

Figure 2:
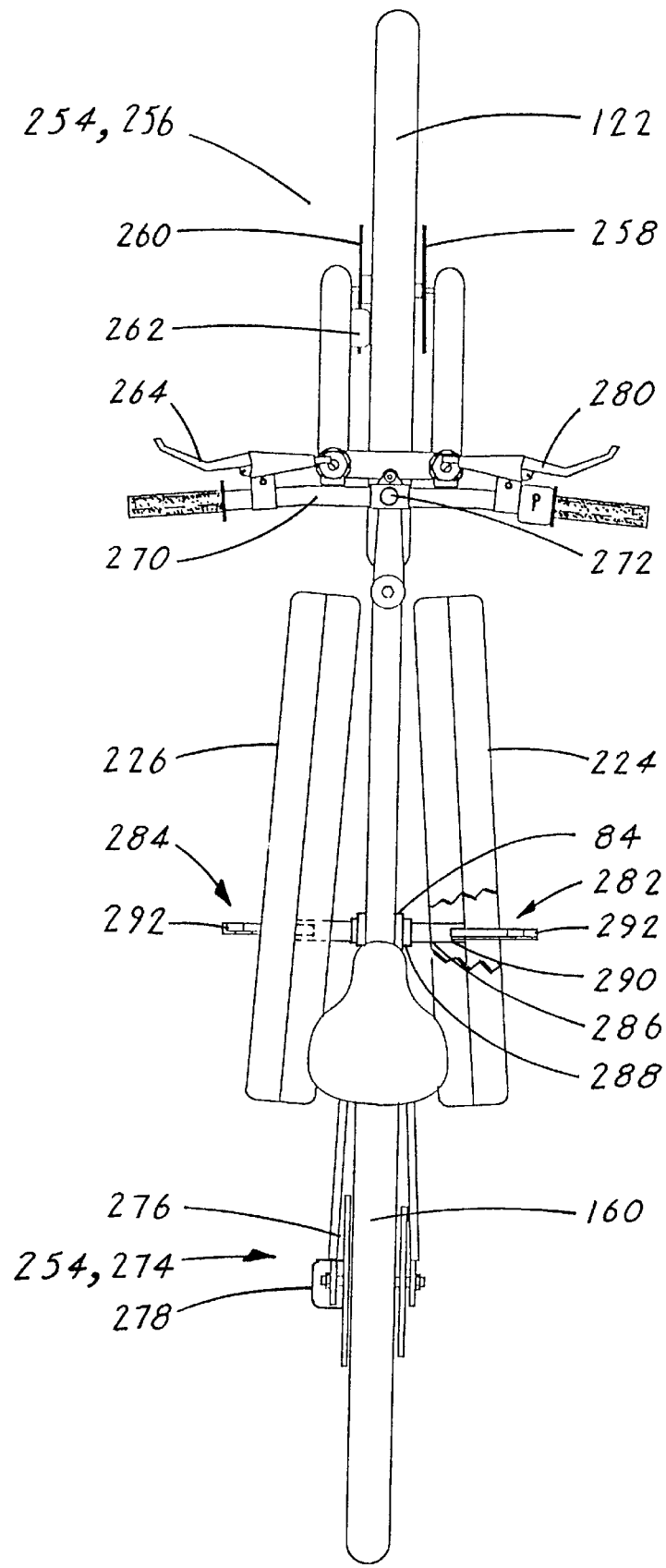
FIG. 2 is a top plan view of the cycle.
Figure 3:
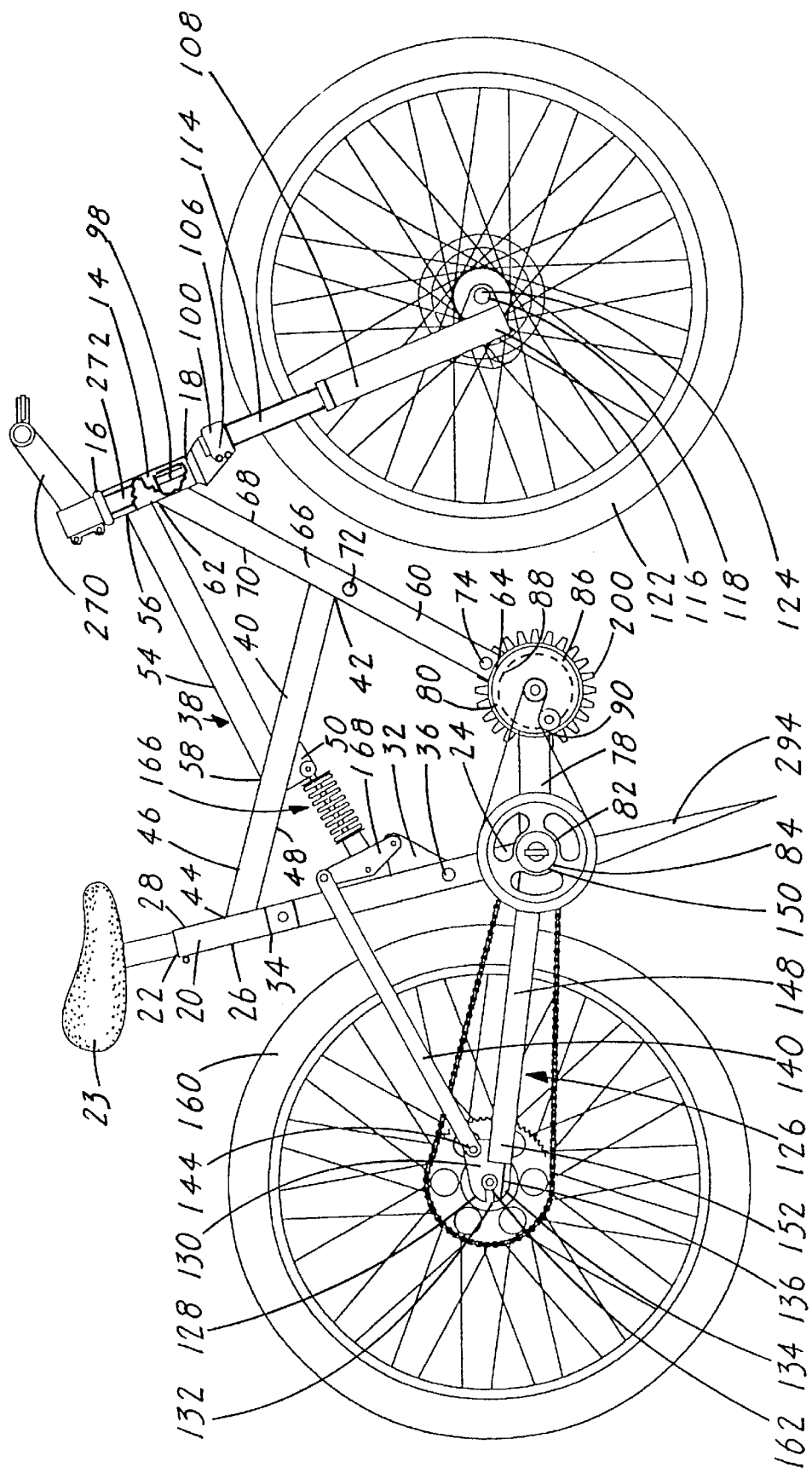
FIG. 3 is a right side elevational view of the cycle with the right battery housing, left battery housing and a portion of the electronic power control system removed for clarity.

The monoplaner frame 12, as shown in FIGS. 1, 2 and particular in FIG. 3, is comprised of five structural members: a head tube 14, a seat tube 20, an upper crossbar assembly 38, a front tube 60 and a lower tube 78.

The head tube 14 includes a top race 16 and a bottom cup 18. The seat tube 20 has an upper end 22 to which is attached a slot 23, a lower end 24, an outer surface 26, an inner surface 28 and sides 30. From the inner surface 28 is attached a first bifurcated bracket 32 and from each of the sides 30 and near the upper end 22 of the seat tube 14 extends outward a battery housing attachment structure 34. Also from each side 30 and below the first bifurcated bracket 32 extends outward a rear battery tray support rod 36.

The upper crossbar assembly 38, as best shown in FIG. 3, is comprised of a first crossbar 40 and a second crossbar 54. The first crossbar 40 has first end 42, a second end 44, an upper surface 46 and a lower surface 48. The second end 44 is attached near the upper end 22 of the seat tube 20, and to the lower surface 48 is attached a second bifurcated bracket 50. The second crossbar 54 has a first end 56 attached to the head tube 14 and a second end 58 attached substantially at the center of the upper surface 46 of the first crossbar 40.

The front tube 60 includes an upper end 62, a lower end 64, sides 66, an outer surface 68, and an inner surface 70. The upper end 62, as shown best in FIG. 3, is attached to the head tube 14, and to the inner surface 70 is attached the first end 42 of the first crossbar 40. From each of the sides 66 and near the attachment of the first crossbar 40 extends laterally a battery housing retaining/pivot rod 72. Near the lower end 64 and from each of the sides 66 also extends laterally a front battery tray support rod 74.

The lower tube 78 has a front end 80 and a rear end 82. The rear end 82 is attached near the lower end 24 of the seat tube 20. At the intersection of the lower tube 78 and the seat tube 20 is attached a third bifurcated bracket 84. To the rear end 82 is attached an upper front surface 88 of a motor mount sleeve 86, which also has a rear surface 90 that is attached to the front end 80 of the lower tube 78. The sleeve 86, which is dimensioned to enclose the electric motor 200 includes a means for tightening the sleeve around the motor 200.

The front damping assembly 94, as shown in FIGS. 1 and 3, includes a bifurcated member 96, a right damping tube 108 and a left damping tube 110. From the upper surface of the bifurcated member 96 is a centered, upward-extending steering tube 98 that is rotatably inserted into the bottom cup 18 of the head tube 14. The member 96 also has a right end 100 and a left end 102, wherein each of these ends have a bore 106 therethrough. Both the right and left damping tubes 108,110 enclose a spring 112, and have an upper end 114 and a lower end 116. The upper ends 114 are inserted into and attached to the respective bores 106 on the right and left ends 100,102 of the bifurcated member 96. The lower ends 116 of the right and left damping tubes 108,110 form a front fork 118. Into the front fork 118 is inserted on axle 124 of the front wheel 122 as shown in FIGS. 1, 2 and 3. For clarity, the left end 102 of the bifurcated member 96 and the left damping tube 110 are not shown in the figures.

The rear fork assembly 126 is comprised of a right bracket 128, a left bracket 138, a right linkage actuator arm 140, a left linkage actuator arm 146, a lower right fork member 148 and a lower left fork member 154. Again for clarity, the left components which are identical to the right components, are not shown in the figures.

The right bracket 128 includes a vertical section 130 having an outward rear wheel attachment slot 132, and a horizontal section having a pair of brake mounting bores 136. The right linkage actuator arm 140 has a front end 142 and a rear end 144. The rear end 144 is attached to the vertical section 130 of the right bracket 128. Likewise, the left linkage actuator arm 146 has a front end 142, and a rear end 144 that is attached to the vertical section 130 of the left bracket 138.

The lower right fork member 148 includes a front end 150 and a rear end 152. The front end 150 is attached to the third bifurcated bracket 84, which is located at the intersection of the seat tube 20 and the lower tube 78. The rear end 152 is attached to the vertical section 130 of the right bracket 128. Likewise, the lower left fork member 154 has a front end 150 and a rear end 152 that is also attached to the third bifurcated bracket 84. The rear end 152 is attached to the vertical section 130 of the left bracket 138. Into the wheel attachment slots 132 on the right bracket 128 and the left bracket 138 is inserted the axle 162 of a rear wheel 160.

Figure 4:
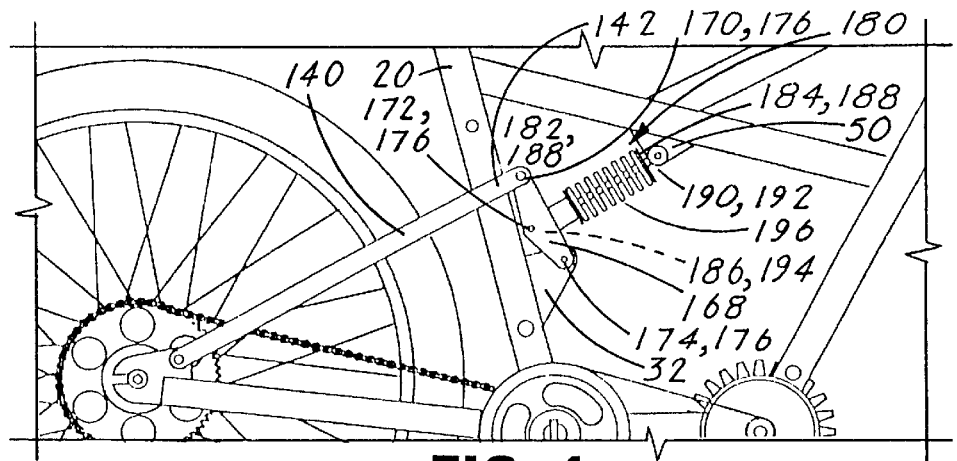
FIG. 4 is a partial right side elevational view showing the details of the rear shock absorbing assembly.

The rear damping assembly 166, as best shown in FIG. 4, is comprised of a pair of rear linkage rocker arms 168 and the rear shock absorbing assembly 180. The rear linkage rocker arms 168 each have an upper bore 170, a center bore 172 and a lower bore 174. The lower bores 174 are rotatably attached by means of a bolt 176 to the first bifurcated bracket 32. The upper bores 170 are rotatably attached by means of a bolt 176, to each of the respective front ends 142 of the right linkage actuator arm 140. The left linkage actuator arm 146 is not shown in FIG. 4 for clarity.

The rear shock absorbing assembly 180 is comprised of a damping cylinder 182, a damper rod 188 and a spring 196. The damping cylinder 182 has an upper end 184 and a lower end 186. From the upper end 184 extends the damper rod 188 which has on its upper end 190 a rod attachment structure 192 that is attached to the second bifurcated bracket 50 as shown in FIG. 4. From the lower end 186 of the cylinder 182 is a cylinder attachment structure 194 that is attached by means of a bolt 176 to the center bore 172 located on the pair of rear linkage rocker arms 168. Around the damping cylinder 182 is located the spring 196 that includes a means for adjusting its compressive force.

The protective cover 202 and the battery tray 214 are shown in FIGS. 1 and 3. The protective cover 202 has an upper surface 204, a lower surface 206, a front end 208 having a central front slot 209, a rear end 210 having a central rear slot 211 and a centered opening 212. To secure the cover 202, the front slot 209 is inserted into the front tube 60, the rear slot 211 is inserted into the seat tube 20 and the centered opening 212 is placed over the second bifurcated bracket 50. When the cover is attached, the upper surface 204 of the cover 202 presses against the lower surface 48 of the first crossbar 40.

The battery tray 214 has an upper surface 216 and a lower surface 218. The lower surface 218 rests upon and is attached to the front and the rear battery tray support rods 74,36.

The right battery housing 224 and the left battery housing 226 each have an upper surface 228, a lower surface 230 and are sized to enclose the respective first and second battery packs 304,306 as described infra. The housings, which are shown in FIGS. 1 and 2 attached to the cycle 10, are designed to be easily installed and removed. To accomplish the installation and removal each of the housings has a front lateral bore 232 and a rear lateral bore 234. The front bore 232 is dimensioned to slide into the housing pivot rod 72 as shown best in FIG. 3. Into the rear bore 234, which is in alignment with the battery housing attachment structure 34, as also shown best in FIG. 3, is inserted a bolt 236 that secures the battery housings 224,226.

Figure 5:
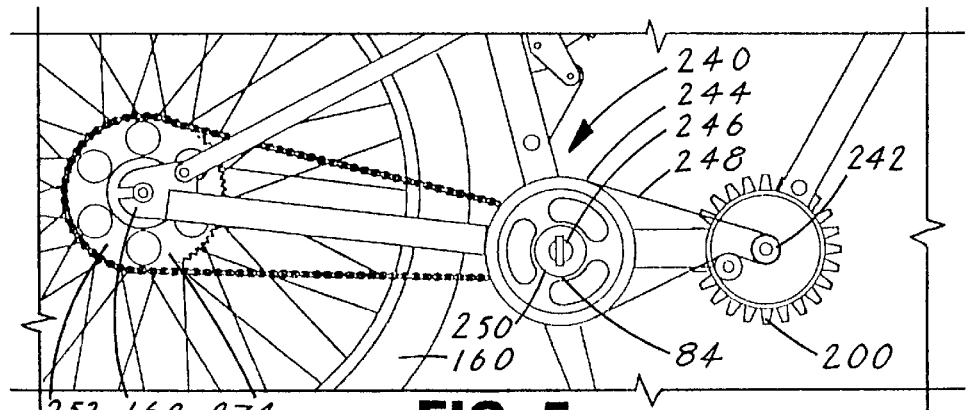
FIG. 5 is a partial right side elevational view showing the details of the cycle drive system.

The cycle drive assembly 240, as shown best in FIG. 5, is comprised of a first sprocket 242, a second sprocket 244, a toothed belt 248, a third sprocket 250, a chain ring 252 and a chain drive 256. The first sprocket 242 is attached to the shaft of the electric motor 200 and the second sprocket 244 is attached to a drive shaft 246 which extends laterally from the third bifurcated bracket 84. The second sprocket 244 is driven by the toothed belt 248 which is connected to the first sprocket 242. The third sprocket 250 which is coaxially attached to and is driven by the second sprocket 244, is connected to the chain ring 252 via the chain drive 253. The chain ring 252 is concentrically attached to the side of the rear wheel 160.

The above-described cycle drive assembly 240 allows the cycle 10 to utilize two stages of gear reduction: the first stage produces a ration of 3 or 4:1 and is comprised of the electric motor 200, the toothed belt 248, the first sprocket 242 and the second sprocket 244. The second stage which also produces a ratio of 3 or 4:1 consists of the chain ring 252 which is driven by the chain drive 256 attached to the third sprocket 250.

The braking system 254, as shown in FIGS. 1 and 2, is comprised of a front brake assembly 262 and a rear brake assembly 274. The front brake assembly 256 is comprised of a right brake disc 258 attached to the right side of the front wheel 122 and a left brake disc 260 attached to the left side of the front wheel 122. The two discs function in combination with a closed-loop hydraulic system 262 that is operated by a left brake lever 264. The lever 264 is located on the left side of the handlebar 270 which includes a vertical shaft 272, as shown in FIG. 3, that is inserted into the top race 16 of the head tube 14.

The rear brake assembly 274 is comprised of a left brake disc 276 that is attached to the left side of the rear wheel 160. The left brake disc 276 also functions in combination with a closed-loop hydraulic system 278 that is operated by a right brake lever 280 located on the right side of the handlebar 270.

To complete the mechanical structure of the cycle 10, the right foot peg 282, the left foot peg 284, the centerstand 294 and a steering stop 299 are utilized.

The right and left foot pegs 282,284, as shown in FIG. 2, are each comprised of a horizontal section 286 having an inward end 288 and an outward vertically slotted end 290. The inward end 288 is attached to the respective right and left sides of the third bifurcated bracket 84. From the slotted end 290 extends outward an articulated foot rest 292 that can be extended for use and retracted when the cycle 10 is parked.

Figure 6:
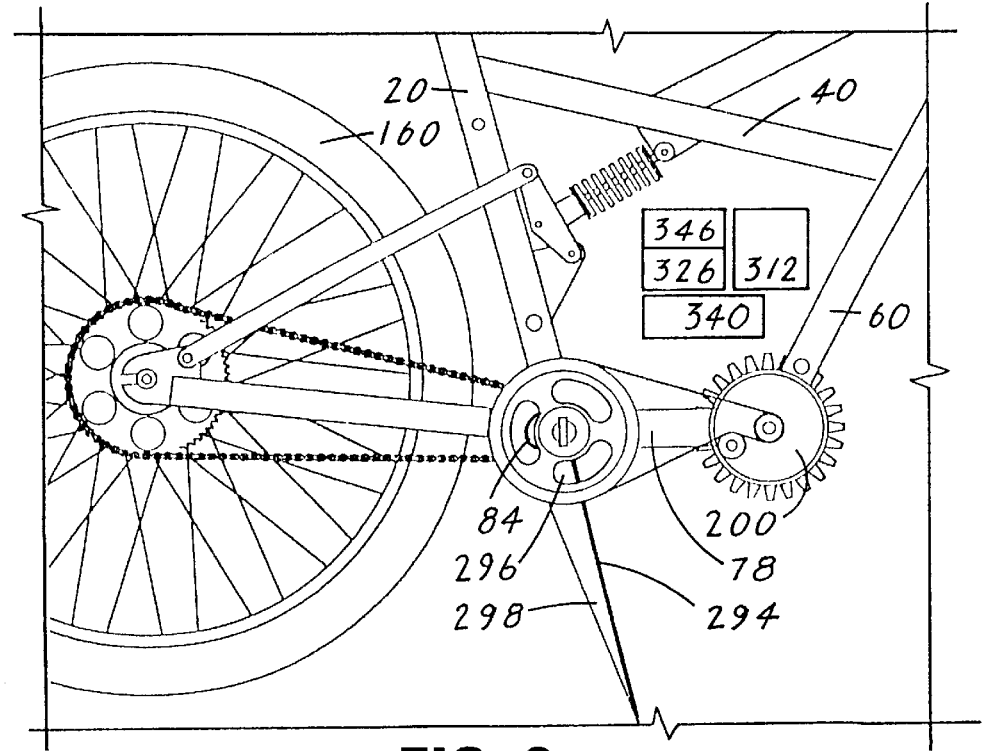
FIG. 6. is a partial right side elevational view showing the details of the centerstand and the location of a portion of the electronic power control system.

The centerstand 294 consists of an upper section 296 from where extends downward and outward a pair of laterally spaced legs 298. The upper section 296 is swivelly attached to the third bifurcated bracket 84, which allows the centerstand to be place din a retracted position (not shown) or in a downward, functional position as shown in FIG. 6. The centerstand 294 allows the cycle 10 to remain balanced when either the front wheel 122 or the rear wheel 160 is removed for servicing. Also the legs 298, have a sufficient lateral separation so that if either of said battery housings 224,226 is removed, the lateral center of gravity remains between the two legs 298 which prevents the cycle 10 from falling sideways.

The steering stop 299, which is shown in FIG. 1, is located between the bottom cup 18 of the head tube 14 and the front damping assembly 94. The steering stop is designed to prevent a cycle user from the danger of acute steering angles.

Figure 7:
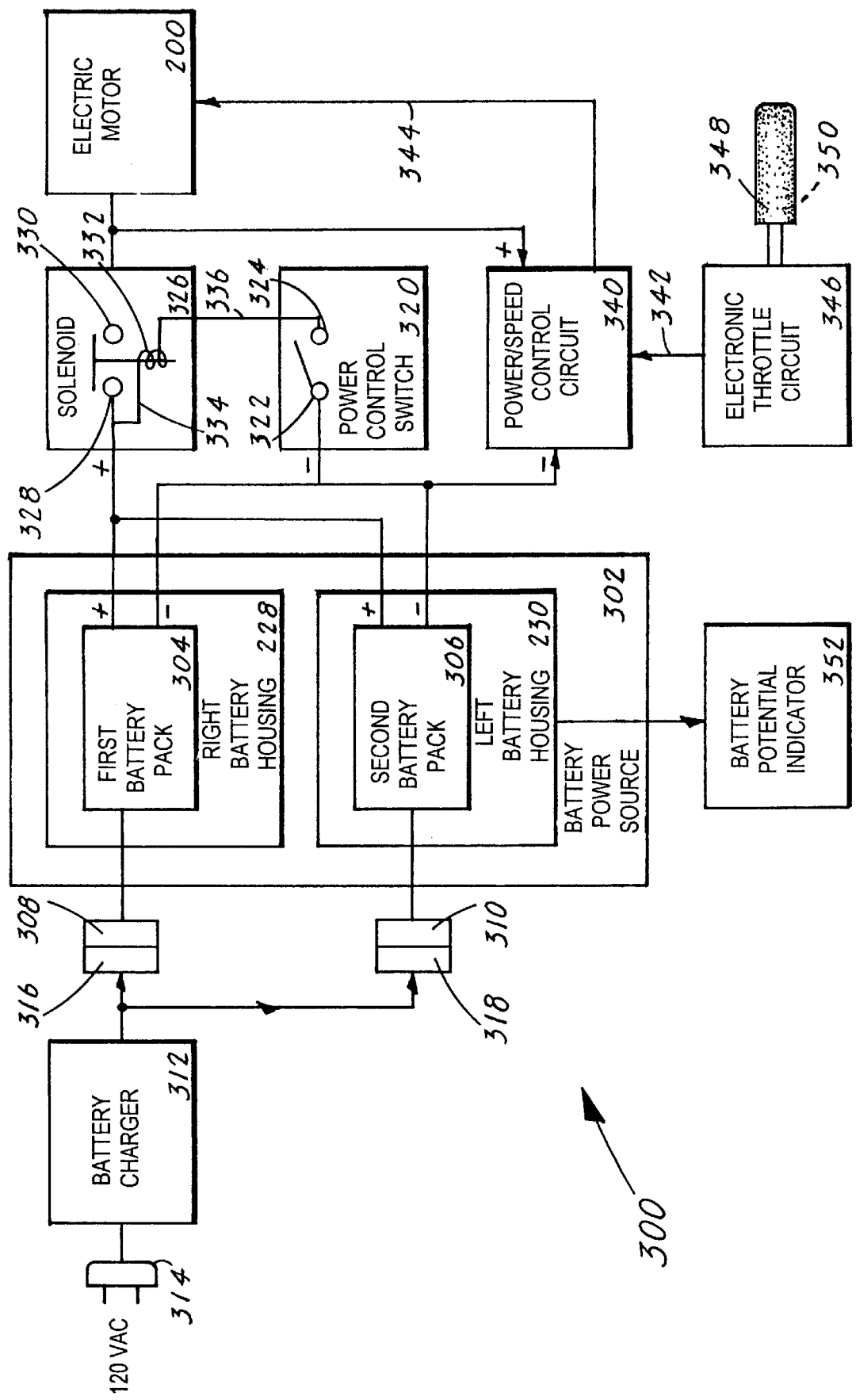
FIG. 7 is a combination block/schematic diagram of the electronic power control system.

The electrical power control circuit 300, which controls the power applied to the electric motor 200 is shown in FIG. 7 and is comprised of a battery power source 302. The power source 302 consists of first battery pack 304 and a second battery pack 306, a battery charger 312, a power control switch 320, a solenoid 326, a power/speed control circuit 340, an electrical throttle circuit 346 and an optional battery potential indicator 352. As shown in FIG. 1, the battery power source 302 is distributed among the right and left battery housings 224,226 which are located on each side of the monoplaner frame 12. The battery charger 312, the solenoid 326, the power/speed control circuit 340 and the electronic throttle circuit 346 are located within the area bordered by the seat tube 20, the first crossbar 40, the front tube 60 and the lower tube 78 as shown in FIG. 6. The remaining items, namely the power control switch 320, the mechanical throttle 348 and the battery potential indicator 352 are located in the vicinity of the head tube 14 and handlebar 270 as shown in FIG. 1.

The first battery pack 304, which is located within the right battery housing 224, has a positive and negative output, and a positive and negative input which are connected to a first input connector 308. Likewise, the second battery pack 306, which is located within the left battery housing 226, has positive and negative outputs which are connected in parallel with the positive and negative outputs of the first battery pack 304. The second battery pack 306 also has a positive negative inputs which are connected to a second input connector 310. In a preferred embodiment, the first and second battery packs 304,306 are each comprised of a first rechargeable battery set and a second rechargeable battery set. Each battery set consists of three 12-volt batteries connected in series and the first and second battery sets are connected in parallel. This configuration provides a total voltage output of 36 volts per battery pack with a capacity of 1150 watt hours.

The combination of the first and second battery packs 304,306 and the right and left battery housings 224,226 account for at least fifty percent of the total cycle weight. The housings are also located to provide a substantially equal front wheel-to-rear wheel loading. Additionally, a means is provided for allowing one of the battery packs to supply power to the cycle 10 while the other battery pack remains in a standby mode. This means is well known in the art and can consist of connectors or switches placed at the output/input of the power packs.

The battery charger 312 has a power input plug 314 that when connected to a utility 120 volts a-c power source the charger 312 becomes operational. The battery charger 312 includes a first output connector 316 and a second output connector 318 that is connected in parallel with the first output connector 316. The first and second output connectors 316,318 can be selectively attached to the first input connector 308 and/or the second input connector 310 as shown in FIG. 7.

The battery charger 312 is preferably designed to have a watt density of at least 15 watts per cubic inch and a power output of at least equal to the ampere hour capacity of the first and second battery packs 304,306. These design parameters insure a maximum one-hour bulk battery recharge capability. Additionally, the battery charger can be designed with a circuit means for providing an automatic cutoff. This cutoff which is well known in the art can be based on time or voltage or a combination of time and voltage.

The power control switch 320 has first contact 322 and a second contact 324. The first contact 322 is connected to the negative output of the battery power source 302.

The solenoid 326 has a first contact 328, a second contact 330 and a control coil 332 which has a first terminal 334 and a second terminal 336. The first contact 328 and the first terminal 334 of the coil 332 are connected to the positive output of the battery power source 302. The second terminal 336 is connected to the second contact 324 of the power control switch 320.

The power/speed control circuit 340 includes a circuit means for receiving a power input, a speed control signal 342 and producing a motor control signal 344. The power input consists of a positive input applied from the second contact 330 of the solenoid 326 and a negative input applied from the negative output of the battery power source 302. The power/speed control circuit 340 utilizes a combination of pulse-width modulation and variable duty cycle switching to control the current and voltage levels of the motor control signal 344, which is applied to and controls the speed of the electric motor 200.

The electronic throttle circuit 346 includes a mechanical throttle 348 and a means for producing the speed control signal 342, which is applied to the power/speed control circuit 340. This signal is variable and is dependent upon the rotational displacement of the throttle 348 applied by a user of the cycle 10. The throttle 348 incorporates a potentiometer 350 which varies a control voltage that is proportional to the rotational displacement of the throttle. This control voltage provides a regulated current to the electric motor 200, via the electronic throttle circuit 346, which causes acceleration. The acceleration continues until a throttle set point is reached or the throttle is retarded. The combination of the power/speed control circuit 340 and the electronic throttle circuit 346 can also be designed to include the operation of a speed governor (not shown).

The operation of the electrical power control system 300 commences when the power control switch 320 is closed by the cycle user. The closing of the switch 320 energizes the solenoid 326 which then activates the power/speed control circuit 340. The motor control signal 344 produced by the circuit 340 is applied to the electrical motor 200. The rotational speed of the motor 200 is controlled by the combination of the power/speed control circuit 340, the electronic throttle circuit 346 and the mechanical throttle 348.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. A multi-terrain electric motor-driven cycle comprising:
   a) a monoplaner frame comprising a head tube, a seat tube having an upper end and a lower end, a front tube having an upper end and a lower end wherein the upper end is attached to the head tube, an upper crossbar assembly comprising a first crossbar and a second crossbar wherein the first crossbar is attached between the front tube and the seat tube and the second crossbar is attached to the first crossbar and the head tube, and a lower tube attached between the lower end of the seat tube and the lower end of the front tube, wherein at the intersection of the front tube and the lower tube is located a means for attaching an electric motor,
   b) a front damping assembly comprising a bifurcated member having an upward extending steering tube that is rotatably inserted into said head tube, a right end and a left end wherein from each end extends downward a right and left damping tube having lower ends that form a front fork into which is inserted and attached a front wheel,
   c) a rear fork assembly comprising:
      (1) a right and a left bracket each having an outward rear wheel attachment slot into which is inserted and attached a rear wheel,
      (2) a right and a left linkage actuator arm each having a front end and a rear end, wherein the rear end is attached to the respective right and left bracket,
      (3) a lower right and a lower left fork member each having a front end and a rear end, wherein the front end is attached to the respective intersection of said seat tube and said lower tube and wherein the rear end is attached respectively to the right and left brackets, and
   d) a rear damping assembly attached between the right and left linkage actuator arms and the first crossbar of the upper crossbar assembly,
   e) a right and left battery housing each dimensioned to be attached by an attachment means ot the front tube and the seat tube,
   f) a cycle drive assembly,
   g) a braking system comprising a front brake assembly and a rear brake assembly,
   h) a right and a left foot peg each laterally attached by an attachment means to the respective right and left sides of the lower tube,
   i) a centerstand swivelly attached to the lower tube, and
   j) an electrical power control circuit having means for controlling the power applied to said electric motor which in turn controls the speed of said cycle.

2. The cycle as specified in claim 1 wherein the design of said cycle allows a payload to be 1.5 times the weight of said cycle.

3. The cycle as specified in claim 1 wherein said cycle drive assembly utilizes two stages of gear reduction, wherein the first stage produces a ratio of 3 or 4:1 and is comprised of said electric motor, a toothed belt, a first sprocket and a second sprocket wherein the second stage, which also produces a ratio of 3 or 4:1, is comprised of a chain ring which is attached to the first side of said rear wheel and is driven by said chain drive connected to said third sprocket.

4. The cycle as specified in claim 1 wherein said centerstand further comprises an upper section from where extends downward and outward a pair of legs, wherein the upper section is swivelly attached via a bracket the lower tube which allows said centerstand to be placed in a retracted position or in a downward functional position, wherein the location of said centerstand allows said cycle to remain balanced when either said front or rear wheel is removed for servicing.

5. The cycle as specified in claim 4 wherein the legs of said centerstand have a sufficient separation so that if either of said battery housings is removed the lateral center of gravity remains between the two legs of said centerstand which prevents said cycle from falling sideways.

6. The cycle as specified in claim 1 wherein said electrical power control circuit further comprises:
   a) a battery pack having a positive terminal and a negative terminal,
   b) a power control switch having a first contact and a second contact, wherein the first contact is connected to the negative terminal of said battery pack,
   c) a solenoid having a first contact, a second contact and a control coil having a first side and a second side, wherein the first contact and the first side of the coil are connected to the positive terminal of said battery pack and the second side is connected to the second contact of said power control switch,
   d) a power/speed control circuit having means for receiving a power input, and a speed control input and producing a motor control output signal, wherein the power input consists of a positive input applied from the second contact of said solenoid and a negative input applied from the negative terminal of said battery pack, and
   e) an electrical throttle having means for producing a speed control signal which is applied to the speed control input on said power/speed control circuit, wherein the speed control signal is variable and is dependent upon the throttle displacement applied by a user of said cycle, wherein when said power control switch is closed, by the cycle user, said solenoid is energized which activates said power/speed control circuit allowing the motor control output signal to be applied to said electrical motor, wherein the rotational speed of said electrical motor is controlled by the combination of said power/speed control circuit and said electronic throttle.

7. The cycle as specified in claim 6 wherein said battery pack is comprised of a first battery pack and a second battery pack which are rechargeable, are connected in parallel and wherein the combination of said battery packs are housings account for at least fifty percent of the total cycle weight and are located to provide substantially equal front-to-rear wheel loading.

8. The cycle as specified in claim 7 further comprising a means for allowing one of said battery packs to supply power to said cycle while the other battery pack remains in a standby mode.

9. The cycle as specified in claim 6 further comprising a battery charger which is permanently installed on said cycle and having:

a) an input connector that attaches via a power cable to a utility power source, b) an output that is hardwired to said battery pack, and c) a circuit means for providing an automatic cutoff which can be based on time, voltage or a combination of both time and voltage.

10. The cycle as specified in claim 9 wherein said battery charger is designed to include the following parameters:

a) a watt density of at least 15 watts per cubic inch, and b) a power output of at least equal to the ampere hour capacity of said battery pack, wherein said parameters insure a maximum one-hour bulk battery recharge capability.

11. The cycle as specified in claim 7 wherein each of said battery packs are comprised of a first set of three batteries connected in series, a second set of three batteries connected in series, where the first set is connected in parallel with the second set, wherein each battery pack produces a voltage of 36 volts with a capacity of 1150 watt hours.

12. The cycle as specified in claim 6 wherein said power/speed control circuit utilizes a combination of pulse-width modulation and a varying duty cycle switching to control the current and voltage applied to said electric motor.

13. The cycle as specified in claim 6 wherein said electrical power control circuit further comprises a battery potential indicator connected to said battery pack and having circuit means for indicating the potential of said battery pack.

14. The cycle as specified in claim 6 wherein said electronic throttle incorporates a potentiometer which varies a control voltage that is proportional to the rotational position of said throttle, wherein the control voltage provides a regulated current to said electric motor which causes an acceleration until a throttle set point is attained or the rotational position of said throttle is retarded.

15. The cycle as specified in claim 9 wherein said electrical power control circuit further comprises a speed governor that is operated via said electronic throttle and said power/speed control circuit.

16. A multi-terrain electric motor-driven cycle comprising:

a) a monoplaner frame comprising:

(1) a head tube having a top race and a bottom cup, (2) a seat tube having an upper end to which is attached a seat, a lower end, an outer surface, an inner surface and sides, wherein from the inner surface is attached a first bifurcated bracket and from each of the sides and near the upper end of said seat tube extends a battery housing attachment structure, and from each of the sides and below the first bifurcated bracket extends a rear battery tray support rod, (3) an upper crossbar assembly comprising a first crossbar and a second crossbar, wherein the first crossbar has a first end, a second end attached near the upper end of the seat tube, an upper surface and a lower surface to which is attached a second bifurcated bracket, and wherein the second crossbar has a first end attached to the head tube and a second end attached substantially at the center of the upper surface of the first crossbar, (4) a front tube having an upper end attached to the head tube, a lower end sides, an outer surface, an inner surface to which is attached the first end of the first crossbar, and wherein from each of the sides and near the attachment location of the first crossbar extends laterally a battery housing retaining/pivot rod and near the lower end and from each of the sides of the front tube also extends laterally a front battery tray support rod, (5) a lower tube having a front end and a rear end, wherein the rear end is attached near the lower end of the seat tube, and wherein at the intersection of said lower tube and said seat tube is attached a third bifurcated bracket, (6) a motor mount sleeve having a upper front surface attached to the lower end of the front tube and a rear surface attached to the front end of the lower tube, b) a front damping assembly comprising:

(1) a bifurcated member having a centered, upward-extending steering tube that is rotatably inserted into the bottom cup of said head tube, a right end and a left and wherein the right and left ends each having a bore therethrough, (2) a right damping tube and a left damping tube wherein each tube encloses a spring, has an upper end and a lower end, wherein the upper ends are inserted into and attached to the respective bores on the right and left ends of the bifurcated member, and wherein the lower ends of the right and left damping tubes form a front fork, c) a front wheel having an axle which is dimensioned to fit into the front fork, d) a rear fork assembly comprising:

(1) a right bracket that includes a vertical section having an outward rear wheel attachment slot and a horizontal section having a pair of brake mounting bores, (2) a left bracket identical to said right bracket, (3) a right linkage actuator arm having a front end and a rear end, wherein the rear end is attached to the vertical section of the right bracket, (4) a left linkage actuator arm having a front end and a rear end, wherein the rear end is attached to the vertical section of the left bracket, (5) a lower right fork member having a front end and a rear end, wherein the front end is attached to the third bifurcated bracket located at the intersection of said seat tube and said lower tube and wherein the rear end is attached to the vertical section of the right bracket, and (6) a lower left fork member having a front end and a rear end, wherein the front end is also attached to the third bifurcated bracket and wherein the rear end is attached to the vertical section of the left bracket, e) a rear wheel having an axle which is dimensioned to fit into the wheel attachment slots on said right bracket and said left bracket, f) a rear damping assembly comprising:, (1) a pair of rear linkage rocker arms wherein each arm has an upper bore, a center bore and a lower bore, wherein the lower bores are rotatably attached, by means of a bolt, to the first bifurcated bracket and the upper bores are rotatably attached, by means of a bolt, respectively to the front ends of said right linkage actuator arm and said left linkage actuator arm, (2) a rear shock absorbing assembly comprising:

(a) a damping cylinder having an upper end and a lower end, wherefrom the upper end extends a damper rod having on its upper end a rod attachment structure that is attached to the second bifurcated bracket and from the lower end is located a cylinder attachment structure that is attached, by means of a bolt, to the center bore on said pair of rear linkage rocker arms,
  (b) a spring located around said damping cylinder wherein said spring has means for adjusting its compressive force,
g) an electric motor enclosed within the motor mount sleeve, wherein said sleeve has means for being tightened around said motor,
h) a protective cover having an upper surface, a lower surface, a front end having a central front slot and a rear end having a central rear slot, wherein to secure said cover, the front slot is inserted into the front tube and the rear slot is inserted into the seat tube with the upper surface of said cover pressed against the lower surface of the first crossbar,
i) a battery tray having an upper surface and a lower surface, wherein the lower surface rests upon and is attached to the front and the rear battery tray support rods,
j) a right battery housing and a left battery housing with each housing having an upper surface, a lower surface, a front lateral bore and a rear lateral bore, wherein the front lateral bore is dimensioned to slide into the housing pivot rod and the rear lateral bore, which is in alignment with the housing attachment structure, is dimensioned ot receive a bolt that is threaded into the housing attachment structure to secure said right and left battery housings, wherein when secured, the lower surface of each said housing rests against the upper surface of said battery tray,
k) a cycle drive assembly comprising:
  (1) a first sprocket attached to the shaft of said motor,
  (2) a second sprocket attached to a drive shaft which extends laterally from the third bifurcated bracket, wherein the second sprocket is driven by a toothed belt connected to the first sprocket,
  (3) a third sprocket coaxially connected to and driven by the second sprocket, and
  (4) a chain ring attached to the side of said rear wheel, wherein the chain ring is driven by a chain drive connected to the third sprocket,
l) a braking system comprising:
  (1) a front brake assembly comprising a right brake disc attached to the right side of said front wheel and a left brake disc attached to the left side of said front wheel, wherein said right and left wheel discs function in combination with a closed-loop hydraulic system that is operated by a left brake lever located on a handlebar having a vertical shaft that is inserted into the top race of said head tube,
  (2) a rear brake assembly comprising a left brake disc attached to the left side of said rear wheel, wherein said left brake disc functions in combination with a closed-loop hydraulic system that is operated by a right brake lever located on said handlebar,
m) a right and a left foot peg each laterally attached to the respective right and left sides of said third bifurcated bracket,
n) a centerstand swivelly attached to said third bifurcated bracket, and
o) an electrical power control system comprising:
  (1) a battery power source comprising:
    (a) a first battery pack located within said right battery housing and having a positive output and a negative output and a positive input and a negative input connected to a first input connector,
    (b) a second battery pack located within said left battery housing and having a positive output and a negative output connected in parallel with the positive and negative outputs of said first battery pack and also having a positive input and a negative input connected to a second input connector,
  (2) a battery charger having a power input plug that when connected to 120 volts a-c utility power said battery charger is operational, wherein said battery charger includes a first output connector and a second output connector connected in parallel with the first output connectors, wherein the first and second output connectors can be selectively attached to the first input connector and/or the second input connector that extend respectively from the first and second battery packs,
  (3) a power control switch having a first contact and a second contact, wherein the first contact is connected to the negative output of said battery power source,
  (4) a solenoid having a first contact, a second contact and a control coil having a first terminal and a second terminal, wherein the first contact and the first terminal of the control coil are connected to the positive output of said battery power source and the second terminal is connected to the second contact of said power control switch,
  (5) a power/speed control circuit having a circuit means for receiving a power input, a speed control signal and producing a motor control signal, wherein the power input consists of a positive input applied from the second contact of said solenoid and a negative input applied from the negative output of said battery power source, and
  (6) an electrical throttle circuit having a manual throttle and means for producing the speed control signal which is applied to said power/speed control circuit, wherein the speed control signal is variable and is dependent upon the rotational displacement of the throttle applied by a user of said cycle, wherein when said power control switch is closed, by the cycle user, said solenoid is energized which activates said power/speed control circuit allowing the motor control output signal to be applied to said electrical motor, wherein the rotational speed of said electrical motor is controlled by the combination of said power/speed control circuit and said electronic throttle circuit.

17. The cycle as specified in claim 16 wherein the design of said cycle allows a payload to be 1.5 times the weight of said cycle.

18. The cycle as specified in claim 16 wherein said cycle drive assembly utilizes two stages of gear reduction, wherein the first stage produces a ratio of 3 or 4:1 and is comprised of said electric motor, said toothed belt, said first sprocket and said second sprocket wherein the second stage which also produces a ration of 3 or 4:1 is comprised of said chain ring which is driven by said chain drive attached to said third sprocket.

19. The cycle as specified in claim 16 wherein each said right foot peg and left foot peg is further comprised of a horizontal section having an inward end and an outward, vertically slotted end, wherein the inward end is attached to the respective right and left sides of said third bifurcated bracket, and from the slotted end extends an articulated foot rest that can be extended for use and retracted when said cycle is parked.

20. The cycle as specified in claim 16 wherein said centerstand is further comprised of an upper section from where extends downward and outward a pair of laterally spaced legs, wherein the upper section is swivelly attached to said third bifurcated bracket which allows said centerstand to be placed in a retracted position or in a downward functional position, wherein the location of said centerstand allows said cycle to remain balanced when either said front wheel or rear wheel is removed for servicing.

21. The cycle as specified in claim 20 wherein the legs of said centerstand have a sufficient lateral separation so that if either of said battery housings is removed, the lateral center of gravity remains between the two legs which prevents said cycle from falling sideways.

22. The cycle as specified in claim 16 further comprising a steering stop located between the bottom cup of the head tube and the front damping assembly wherein said stop prevents acute steering angles.

23. The cycle as specified in claim 16 wherein said first and second battery packs are each comprised of a first rechargeable battery set and a second rechargeable battery set, wherein each battery set consists of three 12-volt batteries connected i series and the first and second battery sets are connected in parallel to provide a total voltage output of 36 volts per battery pack with a capacity of 1150 watt hours.

24. The cycle as specified in claim 23 wherein the combination of said first and second battery packs and said right and left battery housings account for at least fifty percent of the total cycle weight and are located to provide a substantially equal front wheel-to-rear wheel loading.

25. The cycle as specified in claim 24 further comprising a means for allowing one of said battery packs to supply power to said cycle while the other battery pack remains in a standby mode.

26. The cycle as specified in claim 16 wherein said battery charger is designed to have a watt density of at least 15 watts per cubic inch and a power output of at least equal to the ampere hour capacity of said first and second battery packs, wherein said design constraints insure a maximum one-hour bulk battery recharge capability.

27. The cycle as specified in claim 26 wherein said battery charger is further comprised of a circuit means for providing an automatic cutoff which can be based on time or voltage or a combination of time and voltage.

28. The cycle as specified in claim 16 wherein said power/speed control circuit utilizes a combination of pulse-width modulation and variable duty cycle switching to control the current and voltage levels of the motor control signal which is applied to said electric motor.

29. The cycle as specified in claim 16 wherein said mechanical throttle incorporates a potentiometer which varies a control voltage that is proportional to the rotational displacement of said throttle, wherein the control voltage provides a regulated current to said electric motor which causes an acceleration until a throttle set point is attained or the mechanical throttle is retarded.

30. The cycle as specified in claim 16 wherein said electrical power control circuit further comprises a battery potential indicator connected to said battery pack and having circuit means for indicating the potential or capacity of said battery power source.

* * * * *